(12) United States Patent
McIntyre et al.

(10) Patent No.: US 11,027,582 B2
(45) Date of Patent: Jun. 8, 2021

(54) METHOD TO LOCK TPMS SENSOR PROTOCOL PRESSURE DEFINITION

(71) Applicant: Continental Automotive Systems, Inc., Auburn Hills, MI (US)

(72) Inventors: Matthew D. McIntyre, New Baltimore, MI (US); Brian Farrell, Troy, MI (US); Yasser Gad, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 156 days.

(21) Appl. No.: 16/579,953

(22) Filed: Sep. 24, 2019

(65) Prior Publication Data

US 2020/0207164 A1 Jul. 2, 2020

Related U.S. Application Data

(60) Provisional application No. 62/785,414, filed on Dec. 27, 2018.

(51) Int. Cl.
*B60C 23/04* (2006.01)
*B60C 23/00* (2006.01)
*G01L 17/00* (2006.01)

(52) U.S. Cl.
CPC ........ *B60C 23/0474* (2013.01); *B60C 23/002* (2013.01); *G01L 17/00* (2013.01)

(58) Field of Classification Search
CPC .. G01M 17/02; G01M 17/021; G01M 17/022; G01M 17/027; G01M 17/025; G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498;

(Continued)

(56) References Cited

U.S. PATENT DOCUMENTS

| 2014/0245825 A1* | 9/2014 | McIntyre | B60C 23/0474 73/146.3 |
| 2015/0029016 A1* | 1/2015 | Lesesky | B60C 23/0486 340/442 |

(Continued)

*Primary Examiner* — Andre J Allen

(57) ABSTRACT

An apparatus and method is provided that includes measuring a tire pressure for at least one tire with at least one tire pressure sensor. The tire pressure sensor has at least a first resolution for transmitting pressure information and a second resolution for transmitting pressure information that is higher than the first resolution. If a measured tire pressure is determined to be above a predetermined pressure threshold, the apparatus and method identify whether the tire pressure sensor has experienced at least one predetermined vehicle operating characteristic, and/or identify whether the tire pressure sensor has been activated by a command. The tire pressure sensor is only locked into the second resolution if the tire pressure sensor has experienced the at least one predetermined vehicle operating characteristic or if the tire pressure sensor has been activated by the command.

18 Claims, 1 Drawing Sheet

(58) Field of Classification Search
CPC ............ B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC ................................................ 73/146–146.8
See application file for complete search history.

(56) References Cited

U.S. PATENT DOCUMENTS

2016/0375733 A1\* 12/2016 Lesesky .............. B60C 23/0494
340/442
2017/0158000 A1\* 6/2017 Wicher ............... B60C 23/0479

\* cited by examiner

METHOD TO LOCK TPMS SENSOR PROTOCOL PRESSURE DEFINITION

PRIORITY CLAIM

This application claims the benefit of U.S. Provisional Application No. 62/785,414 filed on Dec. 27, 2018.

TECHNICAL FIELD

The subject invention provides a method and system that sets resolutions for tire pressure sensors.

BACKGROUND

A Tire Pressure Monitoring System (TPMS) is an electronic system that monitors tire air pressure. The TPMS reports real-time tire pressure information to a vehicle user via a graphic display, a gauge, or a warning light. The TPMS helps to avoid traffic accidents, improves fuel economy, and decreases tire wear through early recognition of an underinflated state of the tires. TPMS has two different types: direct (dTPMS) and indirect (iTPMS). Indirect TPMS do not use physical pressure sensors but instead measure air pressures by monitoring individual wheel rotational speeds and other signals available outside the tire itself. Direct TPMS employs pressure sensors on each wheel, either internal or external. The sensors physically measure the tire pressure in each tire and report it to the vehicle's instrument cluster or a corresponding control system.

A TPMS sensor may be required to use a different resolution for transmitting the pressure information based on the type of vehicle within which it is installed. For example, if the vehicle is a passenger vehicle, then the pressure resolution may be smaller (e.g. 0.2 PSI per bit). However, if the vehicle is a heavy-duty truck, then the resolution may be larger (e.g. 0.4 PSI per bit). Certain TPMS sensors will lock into the protocol that is required based on certain actions. This causes an issue if the locking criterion is based only on a pressure measurement. There are situations where a technician will overfill a tire while installing the tire for use on a passenger vehicle. This may cause a TPMS sensor to lock into the resolution for the higher pressure vehicles when that was not a desired outcome.

SUMMARY

In one exemplary embodiment, a method includes measuring a tire pressure for at least one tire with at least one tire pressure sensor, wherein the tire pressure sensor has at least a first resolution for transmitting pressure information and a second resolution for transmitting pressure information that is higher than the first resolution; determining if a measured tire pressure is above a predetermined pressure threshold; identifying whether the tire pressure sensor has experienced at least one predetermined vehicle operating characteristic, and/or identifying whether the tire pressure sensor has been activated by a command; and only locking the tire pressure sensor into the second resolution if the tire pressure sensor has experienced the at least one predetermined vehicle operating characteristic or if the tire pressure sensor has been activated by the command.

In another embodiment according to the previous embodiment, wherein setting a sensor resolution for transmitting pressure information is based on a type of vehicle, and wherein the first resolution is for a light-duty vehicle and the second resolution is for a heavy-duty vehicle.

In another embodiment according to any of the previous embodiments, a tire pressure for a light-duty vehicle is 50 psi or less and a tire pressure for a heavy-duty vehicle is greater than 50 psi.

In another embodiment according to any of the previous embodiments, the first resolution is a first psi per bit and the second resolution is a second psi per bit that is greater than the first psi per bit.

In another embodiment according to any of the previous embodiments, wherein identifying whether the tire pressure sensor has experienced at least one predetermined vehicle operating characteristic includes: identifying whether the tire pressure sensor has exceeded a predetermined vehicle speed, and/or identifying whether the tire pressure sensor has been in motion on a vehicle for a certain period of time.

In another embodiment according to any of the previous embodiments, wherein identifying whether the tire pressure sensor has been in motion on a vehicle for a certain period of time includes determining whether the vehicle has been operating above a predetermined speed for a predetermined amount of time and/or determining whether the sensor has been rotating above a predetermined wheel rotational speed for a predetermined amount of time.

In another embodiment according to any of the previous embodiments, the command comprises a LF trigger command that is communicated to the tire pressure sensor.

In another embodiment according to any of the previous embodiments, the LF trigger command is configured to be emitted by a tool in response to a user action.

In another embodiment according to any of the previous embodiments, including automatically setting the tire pressure sensor at the first resolution and only resetting the tire pressure sensor to the second resolution if: a measured tire pressure exceeds the predetermined pressure threshold, and the tire pressure sensor has experienced the at least one predetermined vehicle operating characteristic and/or if the tire pressure sensor has been activated by the command.

In another exemplary embodiment, an apparatus includes at least one tire pressure sensor that measures a tire pressure for at least one tire, wherein the tire pressure sensor has at least a first resolution for transmitting pressure information and a second resolution for transmitting pressure information that is higher than the first resolution; and a control configured to determine if a measured tire pressure is above a predetermined pressure threshold, identify whether the tire pressure sensor has experienced at least one predetermined vehicle operating characteristic, and/or identify whether the tire pressure sensor has been activated by a command, and only lock the tire pressure sensor into the second resolution if the tire pressure sensor has experienced the at least one predetermined vehicle operating characteristic or if the tire pressure sensor has been activated by the command.

In another embodiment according to any of the previous embodiments, the control is configured to set a sensor resolution for transmitting pressure information based on a type of vehicle, and wherein the first resolution is for a light-duty vehicle and the second resolution is for a heavy-duty vehicle.

In another embodiment according to any of the previous embodiments, a tire pressure for a light-duty vehicle is 50 psi or less and a tire pressure for a heavy-duty vehicle is greater than 50 psi.

In another embodiment according to any of the previous embodiments, the first resolution is a first psi per bit and the second resolution is a second psi per bit that is greater than the first psi per bit.

In another embodiment according to any of the previous embodiments, the control identifies whether the tire pressure sensor has experienced at least one predetermined vehicle operating characteristic by: identifying whether the tire pressure sensor has exceeded a predetermined vehicle speed, and/or identifying whether the tire pressure sensor has been in motion on a vehicle for a certain period of time.

In another embodiment according to any of the previous embodiments, the control identifies whether the tire pressure sensor has been in motion on a vehicle for a certain period of time by determining whether the vehicle has been operating above a predetermined speed for a predetermined amount of time, and/or by determining whether the sensor has been rotating above a predetermined wheel rotational speed for a predetermined amount of time.

In another embodiment according to any of the previous embodiments, the command comprises a LF trigger command that is communicated to the tire pressure sensor.

In another embodiment according to any of the previous embodiments, the LF trigger command is configured to be emitted by a tool in response to a user action.

In another embodiment according to any of the previous embodiments, the control automatically sets the tire pressure sensor at the first resolution and only resets the tire pressure sensor to the second resolution if: a measured tire pressure exceeds the predetermined pressure threshold, and the tire pressure sensor has experienced the at least one predetermined vehicle operating characteristic and/or if the tire pressure sensor has been activated by the command.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF AN EMBODIMENT

Figure 1:
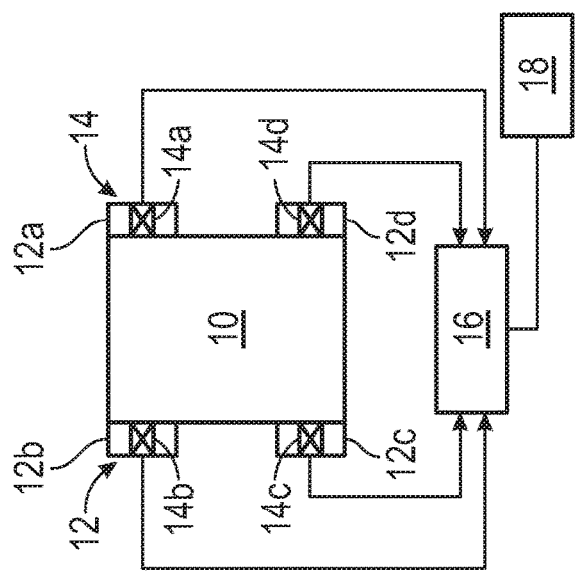
FIG. 1 schematically illustrates a vehicle with a TPMS.

FIG. 1 shows a vehicle 10 having a plurality of tires 12 that have individual tire air pressures that are monitored by sensors 14. A front right sensor 14a is used for a front right tire 12a, a front left sensor 14b is used for a front left tire 12b, a rear left sensor 14c is used for a rear left tire 12c, and a rear right sensor 14d is used for a rear right tire 12d. The sensors 14a, 14b, 14c, 14d measure tire air pressure and communicate pressure data to a controller 16 in a control system. The controller 16 is part of a separate control system or is part of another existing vehicle control system and operates as known.

Smaller vehicles, e.g. passenger or light-duty vehicles, typically have a lower tire pressure as compared to tire pressures for larger or heavy-duty vehicles. For example, a passenger car or light-duty vehicle may have a pressure range that is 50 psi (pounds per square inch) or less, while heavy-duty vehicles may have a pressure range that is greater than 50 psi. In one example, passenger or light-duty vehicles have a pressure range that is 20-50 psi, more preferably 25-40 psi, and more preferably 28-38 psi. In one example, larger or heavy-duty vehicles have a pressure range that is 60-120 psi, and more preferably 60-80 psi.

The tire pressure sensors 14a, 14b, 14c, 14d have a different resolution for transmitting the pressure information/data based on the type of vehicle within which they are installed. Passenger or light-duty vehicles, for example, have a pressure resolution that is smaller (e.g. 0.2 PSI per bit) than that of a heavy-duty truck (e.g. 0.4 PSI per bit). The smaller resolutions are more precise than larger resolutions. Thus, as passenger and light duty vehicle tire pressures are lower, the pressure resolution needs to be more precise than that of the heavy-duty vehicles with tire pressures that are typically much higher. The subject tire pressure sensors 14a, 14b, 14c, 14d are able to be used on all types of vehicles but must be set to the correct pressure resolution for the specific vehicle type on which they are being used.

During maintenance or repair, the tire pressure sensors 14a, 14b, 14c, 14d may have to have the resolution re-set. Re-setting the resolution based on tire pressure alone may lead to having the sensor be re-set to the wrong vehicle type. For example, there are situations where a technician will overfill a passenger vehicle tire, i.e. inflate the tire to a higher than normal pressure, and then back the pressure down to the correct pressure for the tire. However, overfilling a passenger car tire may trigger the tire pressure sensor to lock into the resolution for the heavy-duty vehicle as opposed to the resolution for the passenger vehicle. Further, overinflating the tire may have been done intentionally or may be a mistake.

To address this issue, the subject invention provides a method and system that sets resolutions for the TPMS sensors 14a, 14b, 14c, 14d based on additional information and/or actions, and does not simply rely on pressure measurement alone. For example, the tire pressure sensor will lock into a high pressure resolution or mode if a vehicle speed is detected or if the sensor is activated by a low-frequency (LF) trigger command. A trigger command associates a previously created program to an object and identifies the object event that automatically executes the program. The system operates this way because if vehicle speed is used, then it is known that the tire is installed on the vehicle and is ready to be driven. In addition, if the tire pressure sensor is activated by a LF trigger command, then it is also a deliberate act by a technician and not an accidental overfill during tire mounting.

Figure 2:
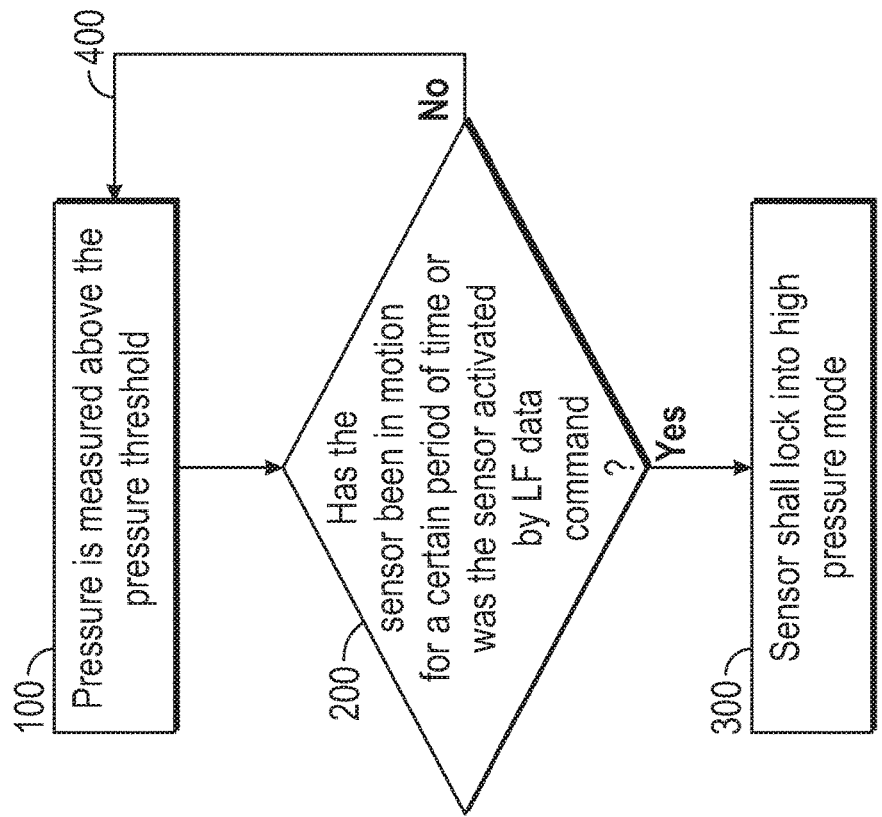
FIG. 2 depicts a flowchart for the inventive system and method.

FIG. 2 shows a flowchart of the basic steps for resetting the tire pressure sensors 14a, 14b, 14c, 14d. First, the tire pressure is measured and there is a determination whether the measured pressure is above a predetermined pressure threshold as indicated at step 100. For example, if the measured pressure level is above a predetermined pressure threshold of 50 psi, the pressure could be correct if the tire pressure sensor is for a heavy-duty vehicle but the pressure could be incorrect if the tire pressure sensor is for a passenger car.

If the measured pressure is above the predetermined pressure threshold, e.g. above 50 psi, the next step 200 is to determine if the tire pressure sensor has experienced a predetermined vehicle operating characteristic, e.g. has been at a certain speed and/or has been in motion for a certain period of time, or to determine whether the tire pressure sensor was activated by a LF trigger command. If the tire pressure sensor has been at a certain speed, e.g. greater than 10 mph and/or has been in motion for a certain period of time, e.g. rotating at a specified speed for at least 5 min, only then is the tire pressure sensor locked into the higher pressure resolution mode as indicated at 300. If the tire pressure sensor has not been in motion for a certain period of time the loop returns to determining whether the measured pressure is above the predetermined pressure threshold as indicated at 400. If the tire pressure sensor has been in motion for a certain period of time at the higher tire pressure, e.g. above 50 psi, the assumption is that the tire pressure is correct and the tires are being used on a heavy-duty vehicle. If the initially measured pressure for a passenger car was above the predetermined pressure threshold but was then backed off to the correct pressure, the tire pressure sensor will not inadvertently lock onto the incorrect larger resolution because it will be below the predetermined pressure threshold while the vehicle is in motion.

In one example, the vehicle 10 includes one or more vehicle sensors 18 that communicate vehicle data to the controller 16. The vehicle sensors 18 can include vehicle speed sensors, acceleration sensors, wheel rotational speed sensors, etc., for example. The vehicle sensors 18 communicate the vehicle data to the controller 16 so that the controller 16 can determine if the tire pressure sensors 14a, 14b, 14c, 14d have experienced a predetermined vehicle operating characteristic, e.g. have been at a certain speed and/or have been in motion for a certain period of time. Identifying whether a tire pressure sensor has been in motion for a certain period of time can include identifying whether the tire pressure sensor has been at a certain vehicle speed for a predetermined amount of time or has been rotating at a certain wheel rotational speed for a predetermined amount of time, for example.

Further, if the tire pressure sensor was activated by a LF trigger command, only then is the tire pressure sensor locked into the higher pressure resolution as indicated at 300. If the tire pressure sensor was not activated by a LF trigger command the loop returns to determining whether the measured pressure is above the predetermined pressure threshold as indicated at 400. If the tire pressure sensor was activated by a LF trigger command for a tire at the higher tire pressure, e.g. above 50 psi, the assumption is that this was an intentional act on the part of the technician such that the tire pressure is correct and the tires are being used on a heavy-duty vehicle. If the initially measured pressure for a passenger car was above the predetermined pressure threshold but was then backed off to the correct pressure, the sensor will not inadvertently lock onto the incorrect larger resolution because there was not an intentional act performed by the technician to verify that the tire pressure was correct.

Figure 3:
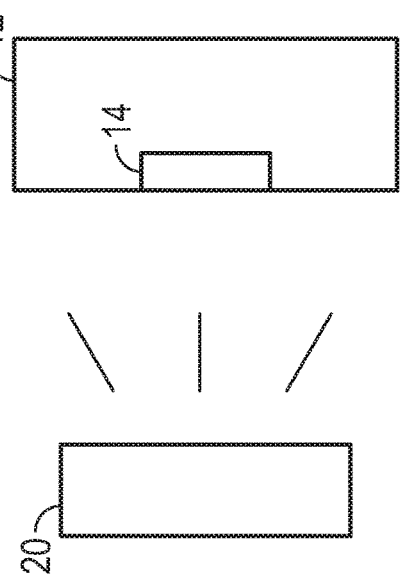
FIG. 3 schematically illustrates a LF trigger command being communicated to a tire pressure sensor.

In one example, the LF trigger command is communicated to the tire pressure sensor via a tool. FIG. 3 shows an example where a tool 20 is used to facilitate installation of a tire pressure sensor 14 on a tire 12. The tool 20 is configured to emit a low-frequency transmission signal that is received by the tire pressure sensor 14. The signal is only emitted in response to a technician activating the LF trigger command via the tool 20. As such, if the controller 16 determines that the sensor 14 was activated by a LF trigger command while the tire was at a pressure that exceeded the predetermined tire pressure threshold, the controller 16 knows that the higher pressure is correct and that the tires are being used on a heavy-duty vehicle. The sensor 14 will then be locked in the greater resolution.

Thus, the subject invention provides a method and system that resets TPMS sensors based on additional information and/or actions other than just pressure measurement alone. The system assumes that the tire pressure sensor is to be set in the smaller resolution for a light-duty vehicle and only locks and sets into the larger resolution for a heavy-duty vehicle if the measured pressure exceeds a predetermined pressure threshold, and has experienced at least one predetermined vehicle operating characteristic and/or has been activated by an intentional command. This significantly decreases the chances of the sensor unintentionally locking in the higher pressure resolution for a passenger or light-duty vehicle application.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A method comprising:
    measuring a tire pressure for at least one tire with at least one tire pressure sensor, wherein the tire pressure sensor has at least a first resolution for transmitting pressure information and a second resolution for transmitting pressure information that is higher than the first resolution;
    determining if a measured tire pressure is above a predetermined pressure threshold;
    identifying whether the tire pressure sensor has experienced at least one predetermined vehicle operating characteristic, and/or identifying whether the tire pressure sensor has been activated by a command; and
    only locking the tire pressure sensor into the second resolution if the tire pressure sensor has experienced the at least one predetermined vehicle operating characteristic or if the tire pressure sensor has been activated by the command.

2. The method according to claim 1, wherein setting a sensor resolution for transmitting pressure information is based on a type of vehicle, and wherein the first resolution is for a light-duty vehicle and the second resolution is for a heavy-duty vehicle.

3. The method according to claim 2, wherein a tire pressure for a light-duty vehicle is 50 psi or less and a tire pressure for a heavy-duty vehicle is greater than 50 psi.

4. The method according to claim 1, wherein the first resolution is a first psi per bit and the second resolution is a second psi per bit that is greater than the first psi per bit.

5. The method according to claim 1, wherein identifying whether the tire pressure sensor has experienced at least one predetermined vehicle operating characteristic includes:
    identifying whether the tire pressure sensor has exceeded a predetermined vehicle speed, and/or
    identifying whether the tire pressure sensor has been in motion on a vehicle for a certain period of time.

6. The method according to claim 5, wherein identifying whether the tire pressure sensor has been in motion on a vehicle for a certain period of time includes determining whether the vehicle has been operating above a predetermined speed for a predetermined amount of time and/or determining whether the sensor has been rotating above a predetermined wheel rotational speed for a predetermined amount of time.

7. The method according to claim 1, wherein the command comprises a LF trigger command that is communicated to the tire pressure sensor.

8. The method according to claim 7, wherein the LF trigger command is configured to be emitted by a tool in response to a user action.

9. The method according to claim 1, including automatically setting the tire pressure sensor at the first resolution and only resetting the tire pressure sensor to the second resolution if:
   a measured tire pressure exceeds the predetermined pressure threshold, and
   the tire pressure sensor has experienced the at least one predetermined vehicle operating characteristic and/or if the tire pressure sensor has been activated by the command.

10. An apparatus comprising:
   at least one tire pressure sensor that measures a tire pressure for at least one tire, wherein the tire pressure sensor has at least a first resolution for transmitting pressure information and a second resolution for transmitting pressure information that is higher than the first resolution; and
   a control configured to
   determine if a measured tire pressure is above a predetermined pressure threshold,
   identify whether the tire pressure sensor has experienced at least one predetermined vehicle operating characteristic, and/or identify whether the tire pressure sensor has been activated by a command, and
   only lock the tire pressure sensor into the second resolution if the tire pressure sensor has experienced the at least one predetermined vehicle operating characteristic or if the tire pressure sensor has been activated by the command.

11. The apparatus according to claim 10, wherein the control is configured to set a sensor resolution for transmitting pressure information based on a type of vehicle, and wherein the first resolution is for a light-duty vehicle and the second resolution is for a heavy-duty vehicle.

12. The apparatus according to claim 11, wherein a tire pressure for a light-duty vehicle is 50 psi or less and a tire pressure for a heavy-duty vehicle is greater than 50 psi.

13. The apparatus according to claim 10, wherein the first resolution is a first psi per bit and the second resolution is a second psi per bit that is greater than the first psi per bit.

14. The apparatus according to claim 10, wherein the control identifies whether the tire pressure sensor has experienced at least one predetermined vehicle operating characteristic by:
   identifying whether the tire pressure sensor has exceeded a predetermined vehicle speed, and/or
   identifying whether the tire pressure sensor has been in motion on a vehicle for a certain period of time.

15. The apparatus according to claim 14, wherein the control identifies whether the tire pressure sensor has been in motion on a vehicle for a certain period of time by determining whether the vehicle has been operating above a predetermined speed for a predetermined amount of time, and/or by determining whether the sensor has been rotating above a predetermined wheel rotational speed for a predetermined amount of time.

16. The apparatus according to claim 10, wherein the command comprises a LF trigger command that is communicated to the tire pressure sensor.

17. The apparatus according to claim 16, wherein the LF trigger command is configured to be emitted by a tool in response to a user action.

18. The apparatus according to claim 10, wherein the control automatically sets the tire pressure sensor at the first resolution and only resets the tire pressure sensor to the second resolution if:
   a measured tire pressure exceeds the predetermined pressure threshold, and
   the tire pressure sensor has experienced the at least one predetermined vehicle operating characteristic and/or if the tire pressure sensor has been activated by the command.

* * * * *